United States Patent
Ding et al.

(10) Patent No.: US 10,698,865 B2
(45) Date of Patent: Jun. 30, 2020

(54) MANAGEMENT OF B-TREE LEAF NODES WITH VARIABLE SIZE VALUES

(71) Applicant: VMware, Inc., Palo Alto, CA (US)

(72) Inventors: Li Ding, Cupertino, CA (US); Richard P. Spillane, Mountain View, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 224 days.

(21) Appl. No.: 15/633,726

(22) Filed: Jun. 26, 2017

(65) Prior Publication Data

US 2018/0373727 A1    Dec. 27, 2018

(51) Int. Cl.
*G06F 16/17*    (2019.01)
*G06F 16/13*    (2019.01)
*G06F 16/14*    (2019.01)
*G06F 16/16*    (2019.01)

(52) U.S. Cl.
CPC .......... *G06F 16/1727* (2019.01); *G06F 16/13* (2019.01); *G06F 16/14* (2019.01); *G06F 16/162* (2019.01)

(58) Field of Classification Search
CPC .. G06F 16/1727; G06F 16/17; G06F 16/1314; G06F 16/126
USPC .................................................. 711/163, 102
See application file for complete search history.

(56) References Cited

U.S. PATENT DOCUMENTS

| | | | | |
|---|---|---|---|---|
| 5,752,243 A * | 5/1998 | Reiter | ................. | G06F 16/2246 |
| 7,136,867 B1 * | 11/2006 | Chatterjee | .......... | G06F 16/9027 |
| | | | | 713/171 |
| 7,672,945 B1 * | 3/2010 | Chatterjee | ............. | G06F 16/907 |
| | | | | 707/999.009 |
| 8,489,638 B2 * | 7/2013 | Kuszmaul | .......... | G06F 11/1471 |
| | | | | 707/790 |
| 8,900,054 B2 * | 12/2014 | Patel | ....................... | G07F 17/32 |
| | | | | 463/29 |
| 9,075,710 B2 * | 7/2015 | Talagala | ................. | G06F 3/064 |
| 9,613,128 B2 * | 4/2017 | Bentkofsky | ........... | G06F 16/285 |
| 9,959,279 B2 * | 5/2018 | Archak | ................ | G06F 16/172 |
| 10,303,673 B2 * | 5/2019 | Vemulapati | ......... | G06F 16/2246 |
| 2004/0210582 A1 * | 10/2004 | Chatterjee | ............... | G06F 16/27 |
| 2008/0091691 A1 * | 4/2008 | Tsuji | ..................... | G06F 16/284 |
| 2014/0325115 A1 * | 10/2014 | Ramsundar | ......... | G06F 12/0238 |
| | | | | 711/102 |
| 2014/0330829 A1 * | 11/2014 | Bentkofsky | ........... | G06F 16/285 |
| | | | | 707/737 |

(Continued)

OTHER PUBLICATIONS

Key-sequence data sets on indelible storage (Year: 1986).*
A Fast Key-Value Storage System for Variable-Length String Keys (Year: 2016).*

*Primary Examiner* — Jean M Corrielus
(74) *Attorney, Agent, or Firm* — Loza & Loza, LLP

(57) ABSTRACT

System and method for managing leaf nodes of a B-tree for a file system of a computer system utilize used slots in a directory section of a leaf node to index variable size key-value pair entries stored in a data section of the leaf node and free spaces slots in the directory section to index contiguous free spaces in the data section. Contents of the free space slots in the directory section are updated in response to changes in the contiguous free spaces in the data section to manage free space in the data section of the leaf node.

20 Claims, 16 Drawing Sheets

(56) References Cited

U.S. PATENT DOCUMENTS

2017/0060924 A1* 3/2017 Fitzhardinge ....... G06F 16/2246
2017/0329871 A1* 11/2017 Subramani .......... G06F 16/2246

* cited by examiner

MANAGEMENT OF B-TREE LEAF NODES WITH VARIABLE SIZE VALUES

BACKGROUND

B-tree is a commonly used on-disk data structure in file systems and storage systems. B-tree stores key-value pairs and supports efficient create, read (lookup), update, delete, and range scans operations. The keys of the key-value pairs in a B-tree are usually fixed in size. However, the values of the key-value pairs in a B-tree are often variable in size when used in file systems, such Virtual Distributed File System (VDFS) and B-tree file system (Btrfs). Unfortunately, introducing variable size values to a B-tree significantly increases the complexity of the leaf node disk layout.

On one extreme, the use of variable size values can eliminate the need for free space management since memory can be moved and leaf nodes can be compacted on every B-tree update. Btrfs uses this approach for a leaf node in which a fixed size index, where the keys are located, is at the beginning of the node, while the values are at the end of the node. This approach is simple to implement but it causes excessive memory movement because all values must be repacked before the node is written out to disk. The extra CPU cost spent on such memory movement significantly reduces B-tree update performance.

On the other extreme, it is possible to use a bitmap to manage free space and reduce memory movement to the minimum. However, a bitmap takes up space, introduces complexity and costs extra CPU time, which are significant reasons not to use bitmap allocations in a relatively small region of a B-tree node.

BRIEF DESCRIPTION OF THE DRAWINGS

Throughout the description, similar reference numbers may be used to identify similar elements.

DETAILED DESCRIPTION

Figure 1:
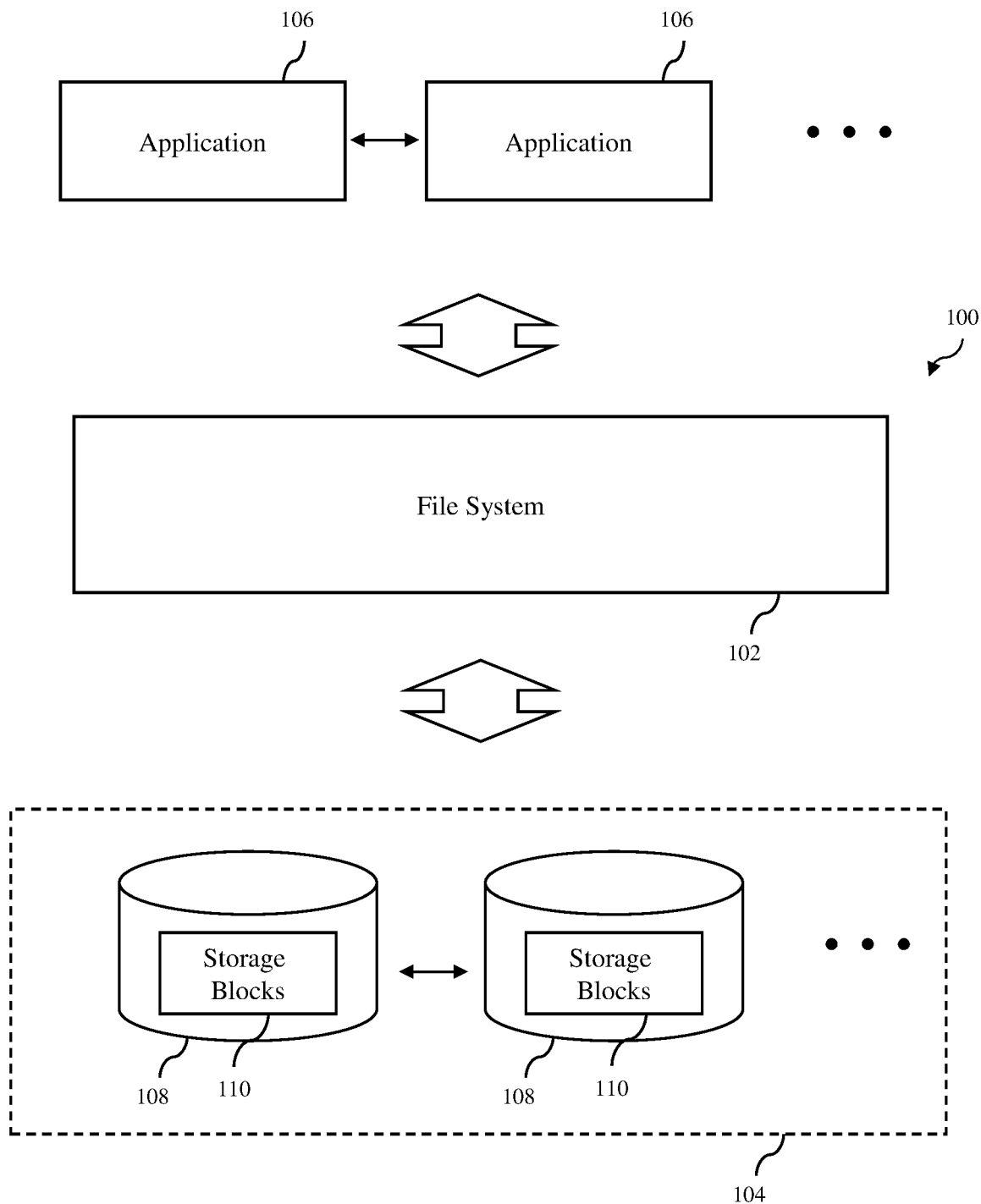
FIG. 1 is a block diagram of a computer system in accordance with an embodiment of the invention.

FIG. 1 depicts a computer system 100 in accordance with an embodiment of the invention. The computer system is shown to include a file system 102 and a storage system 104. Other components of the computer system that are commonly found in a conventional computer system, such as memory and one or more processors, are not shown in FIG. 1. The computer system allows applications 106 to perform file system operations, such as accessing metadata information or actual stored data of file system objects, e.g. directories, folders or files, and/or modifying the metadata information or the actual stored data of file system objects. As described in detail below, the metadata of the file system objects are efficiently stored in B-tree structures having leaf nodes that can store variable size values of key-value pairs. The B-tree leaf nodes in accordance with embodiments of the invention do not need bitmaps to manage free space within the nodes. In addition, the B-tree leaf nodes are designed so that values in the nodes do not have to be repacked on every update of the nodes.

The applications 106 can be any software program that can run on the computer system 100, which can be a physical computer, a virtual computer, such as a VMware virtual machine, or a distributed computer system. The applications may perform various file system operations, such as read, write, delete, and rename operations for file system objects stored in the storage system 104.

The storage system 104 includes one or more computer data storage devices 108, which are used by the computer system 100 to store data, including metadata of file system objects and actual data of the file system objects. The data storage devices can be any type of non-volatile storage devices that are commonly used for data storage. As an example, the data storage devices may be, but not limited to, solid-state devices (SSDs), hard disks or a combination of the two. The storage space provide by the data storage devices may be divided into storage blocks 110, which may be disk blocks, disk sectors or other storage device sectors.

In an embodiment, the storage system 104 may be a local storage system of the computer system 100, such as hard drive disks in a personal computer system. In another embodiment, the storage system may be a remote storage system that can be accessed via a network, such as a network-attached storage (NAS). In still another embodiment, the storage system may be a distributed storage system such as a storage area network (SAN) or a virtual SAN. Depending on the embodiment, the storage system may include other components commonly found in those types of storage systems, such as network adapters, storage drivers and/or storage management servers. The storage system may be scalable, and thus, the number of data storage devices 108 included in the storage system can be changed as needed to increase or decrease the capacity of the storage system to support increase/decrease in workload. Consequently, the exact number of data storage devices included in the storage system can vary from one to hundreds or more.

The file system 102 operates to present storage resources of the storage system 104 as one or more file system structures, which include hierarchies of file system objects, such as file system volumes, file directories/folders, and files, for shared use of the storage system. Thus, the file system organizes the storage resources of the storage system into the file system structures so that the applications can access the file system objects for various file system operations, such as creating file system objects, deleting file system objects, writing or storing file system objects, reading or retrieving file system objects and renaming file system objects.

The file system 102 maintains storage metadata of actual data of file system objects stored in the storage system 104.

As used herein, the actual data of file system objects stored in the storage system is content, such as the contents or actual data of files, and the storage metadata describes that content with respect to its characteristics and physical storage locations. Thus, the storage metadata is information that describes the actual stored data, such as names, file paths, modification dates and permissions. The storage metadata can also be stored in any other storage accessible by the file system. In a distributed file system architecture, the storage metadata may be stored in multiple metadata servers located at different storage locations.

Figure 2:
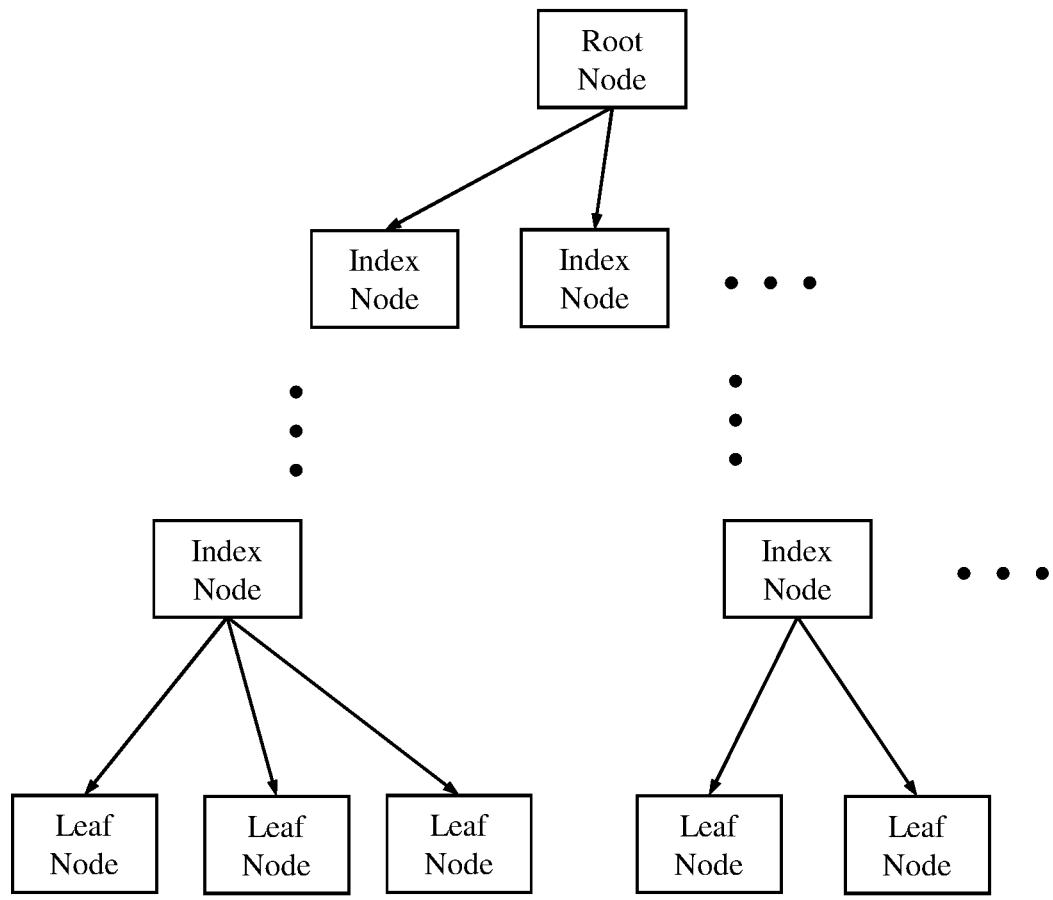
FIG. 2 is a diagram of a B-tree used by a file system of the computer system shown in FIG. 1 in accordance with an embodiment of the invention.

In an embodiment, the file system 102 stores the storage metadata in B-tree structures. A B-tree structure in accordance with an embodiment of the invention is illustrated in FIG. 2. As shown in FIG. 2, the B-tree structure includes a root node, a number of internal or index nodes and a number of leaf nodes. The root node contains references or entries that point to index nodes. Each index node contains references or entries that point to other index nodes or leaf nodes. Each leaf node contains key-value pairs for file system objects stored in the storage system 104, where the values of the key-value pairs are variable in size. Thus, a particular key-value pair can be found by locating the leaf node that contains that key-value pair using pointers in the root node and any index nodes that lead to that leaf node. As described in more detail below, the leaf nodes are managed in an efficient manner without the use of any bitmaps, which would add complexity to free space management and require significant extra CPU processing time, and without the need for repacking of the variable size values for each leaf node update.

Figure 3:
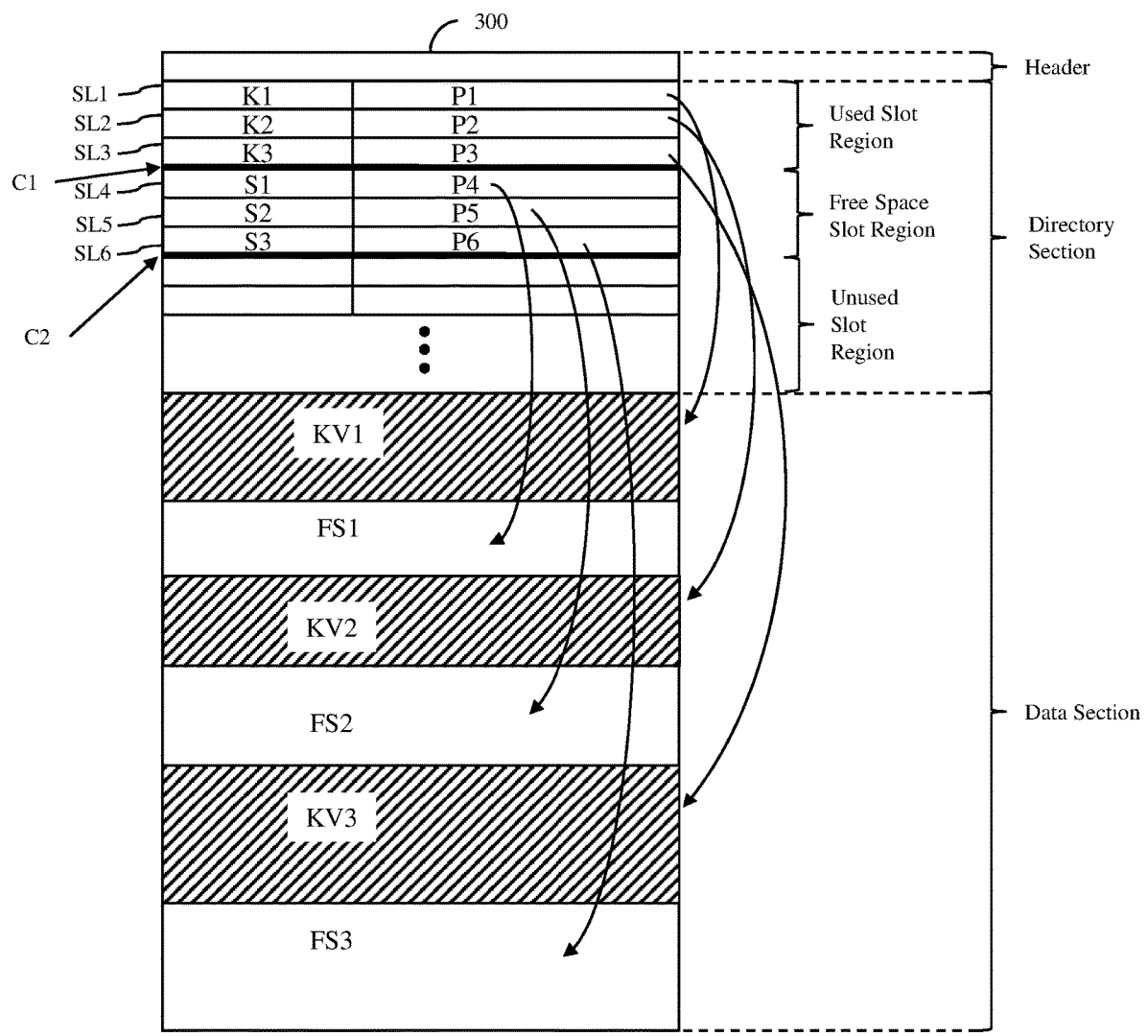
FIG. 3 is a diagram of a B-tree leaf node in accordance with an embodiment of the invention.

An exemplary B-tree leaf node 300 in accordance with an embodiment of the invention is illustrated in FIG. 3. As shown in FIG. 3, the leaf node includes a header, a directory section and a data section. The header includes information regarding that particular node, such as an identification (ID) of the node. The header may also include identifications of nodes that point to this node, as well as other information regarding the node. The directory section includes an N number of slots, where N can be any integer. In an embodiment, the size of the directory section is fixed and the size of each slot is fixed. As an example, each slot in the directory section may be a 2-byte slot. Thus, in this embodiment, the number of slots contained in the directory section is fixed. These slots in the directory section are used to index key-value pairs stored in the data section, as well as contiguous free spaces in the data section. In particular, the slots are used to point to the key-value pairs stored in the data section, which will be referred to herein as "used slots," and to point to the contiguous free spaces of the data section, which will be referred to herein as "free space slots." The slots that are not currently used to point to key-value pairs or to contiguous free spaces will be referred to herein as "unused slots." Each used slot in the directory section includes the key of a key-value pair stored in the data section of the leaf node and a pointer pointing to the key-value pair in the data section. Alternatively, each used slot in the directory section includes a pointer pointing to the key-value pair in the data section. In order to find a particular key-value pair in the data section, a binary search (or a linear search if the number of key-value pairs is small) is used to compare the key-value pair against the target key. If the used slot includes only a pointer, a search algorithm will first dereference the pointer in the slot to fine the key-value pair and then perform the comparison. Thus, indexing of key-value pairs in the data section is achieved using the used slots in the directory section. In one implementation, the used slots are sorted by the keys stored in the slots, e.g., alphabetically, numerically or any predefined order, which may be defined by a function associated with the application using the file system 102. Each free space slot in the directory section includes the size of a contiguous free space in the data section of the leaf node and a pointer pointing to that contiguous free space in the data section. Thus, indexing of contiguous free spaces in the data section is achieved using the free space slots in the directory section. In one implementation, the free space slots are sorted by the sizes of their corresponding contiguous free spaces from smallest to the largest or vice versa using size values contained in the free space slots. Each unused slot in the directory section may contain no information, and may be filled with some predefined values, such as all zeros or ones. These different types of slots in the directory section are managed in different regions of the directory section. Thus, the directory section includes a used slot region, which contains the used slots, a free space slot region, which contains the free space slots, and an unused slot region, which contains the unused slots.

In the example shown in FIG. 3, there are three used slots SL1, SL2 and SL3 in the used slot region of the directory section. The slot SL1 includes a key K1 and a pointer P1. The slot SL2 includes a key K2 and a pointer P2. The slot SL3 includes a key K3 and a pointer P3. As described below, the pointers in the used slots SL1, SL2 and SL3 point to key-value pair entries stored in the data section of the leaf node that correspond to the keys in the used slots. The used slots SL1, SL2 and SL3 may be arranged in a predefined order based on their keys, e.g., ascending or descending order with respect to number, alphabet, or a function that may be provided by the application using the B-tree. In this example, the used slots SL1, SL2 and SL3 are assumed to be arranged in an ascending order, and thus, the keys K1, K2 and K3 have the following properties: K1<K2<K3.

Also in the example shown in FIG. 3, there are three free space slots SL4, SL5 and SL6 in the free space slot region of the directory section. The slot SL4 includes a size value S1 and a pointer P4. The slot SL5 includes a size value S2 and a pointer P5. The slot SL6 includes a size value S3 and a pointer P6. As described below, the pointers in the free space slots SL4, SL5 and SL6 point to contiguous free spaces in the data section of the leaf node. In this example, the free space slots SL4, SL5 and SL6 are arranged in an ascending order based on the sizes of the contiguous free spaces in the data section to which their pointers are pointing, as indicated by the size values S1, S2 and S3 stored in the slots SL4, SL5 and SL6, respectively. Thus, the first free space slot, which is the free space slot SL4, corresponds to the smallest contiguous free space in the data section, the second free space slot, which is the free space slot SL5, corresponds to the second smallest contiguous free space in the data section, and so on.

The sizes of the used, free space and unused slot regions may be monitored using cursors. In an embodiment, the leaf node uses two cursors to monitor the sizes of the different regions. The first cursor indicates the size of the used slot region, while the second cursor indicates the size of the free space slot regions. These cursors may be stored as values in the header of the leaf node. In the example shown in FIG. 3, the directory section begins with the used slot region followed by the free space slot region and then the unused slot region, which are monitored by first and second cursors C1 and C2. The first cursor C1 points to the end of the used slot region. Since the beginning of the used slot region is known, the size of the used slot region can be defined by the first cursor C1. The first cursor C1 also coincides with the beginning of the free space slot region, which can thus be used to define the size of the free space slot region. The second cursor C2 points to the end of the free space slot region. Using the first cursor C1, the free space slot region can be defined by the second cursor C2. The second cursor also coincides with the beginning of the unused slot region, which can thus be used to define the size of the unused slot region. Since the end of the directory section is known, the unused slot region can be defined by the second cursor C2. As the sizes of the different regions change, the first and second cursors C1 and C2 are changed accordingly. Figuratively speaking, as illustrated in FIG. 3, the first and second cursors C1 and C2 move up and down as the numbers of used, free space and unused slots change. In one implementation, the first cursor C1 equals the number of used slots and the second cursor C2 equals the number of free space slots. The first and second cursors C1 and C2 may be stored in the header of the leaf node.

The data section of the leaf node 300 is used to store the key-value pairs that correspond to the keys stored in the used slots in the used slot region of the directory section. The key-value pairs may be variable in size. In an embodiment, the keys of the key-value pairs are fixed in size, but the values of the key-value pairs can vary in size. Thus, the stored key-value pairs in the data section are not fixed with respect to their size. As an example, some of the stored key-value pairs may be 60 bytes in size, while other stored key-value pairs may be 16 bytes, 23 bytes, 96 bytes or 97 bytes in size. If the key-value pair size is not aligned to the slot size, it is rounded up to the slot size. For example, if slot size is 4 bytes, the key-value pairs of size 16, 23, 96, 97 bytes will actually consume 16, 24, 96, 100 bytes in the leaf node. As noted above, the key-value pairs stored in the data section can be found using pointers in the used slots in the used slot region of the directory section. Thus, each stored key-value pair has a unique pointer associated with that stored key-value pair. Since the data section will normally not be entirely filled with stored key-value pairs, the data section will have one or more contiguous free spaces, some of which are contiguous free spaces between stored key-value pairs. These contiguous free spaces are used when additional key-value pairs need to be stored in the leaf node. As noted above, the contiguous free spaces in the data section can be found using pointers in the free space slots in the free space slot region of the directory section.

In the example shown in FIG. 3, the data section of the leaf node 300 includes three key-value pairs KV1, KV2 and KV3. The key-value pair KV1, KV2 and KV3 correspond to the keys K1, K2, and K3 in the used slots SL1, SL2 and SL3, respectively. That is, the key-value pair KV1, KV2 and KV3 include the keys K1, K2, and K3, respectively, which are also stored in the used slots SL1, SL2 and SL3. Thus, the pointers P1, P2 and P3 in these used slots point to the key-value pairs KV1, KV2 and KV3 in the data section, respectively. The data section also includes three contiguous free spaces FS1, FS2 and FS3, which correspond to the free space slots SL4, SL5 and SL6, respectively. Thus, the pointers P4, P5 and P6 in these free space slots point to the contiguous free spaces FS1, FS2 and FS3 in the data section, respectively. In this example, the sizes of the contiguous free spaces FS1, FS2 and FS3 are 64 bytes, 120 bytes and 244 bytes, respectively. Note that the free space size are multiples of slot size, and the above example numbers (64, 120, 244) assumed a slot size of 4 bytes.

The structure of the B-tree leaf nodes, as described above with respect to the leaf node 300, allows the file system to manage the stored key-value pairs and free space in the data section of each leaf node using the slots in the directory section of the leaf node without the need to use any bitmaps or the need to repack the stored key-value pairs in the data section for every update, e.g., adding a new key-value pair entry, deleting an existing key-value pair entry or modifying an existing key-value pair entry.

Figure 4:
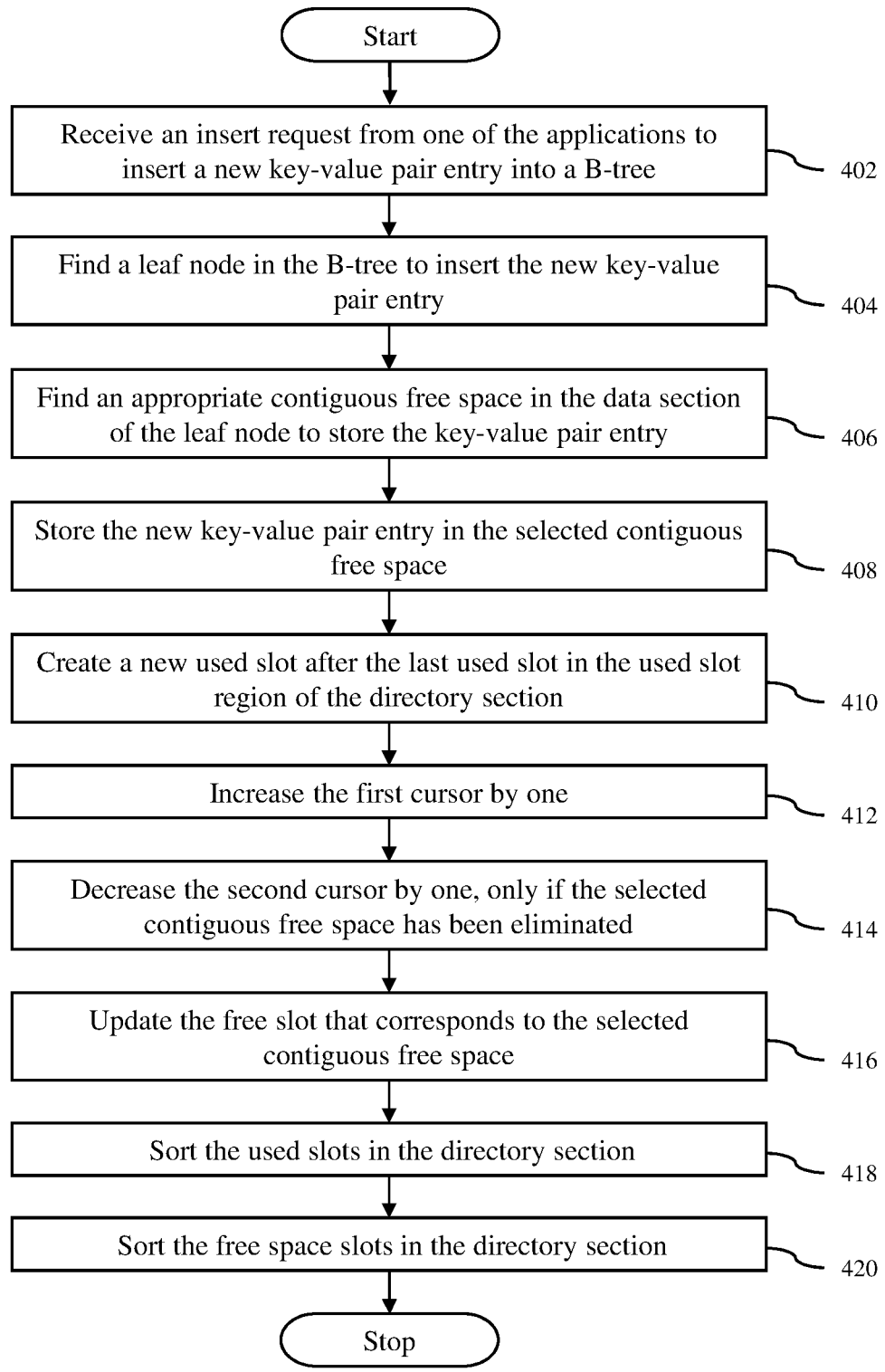
FIG. 4 is a process flow diagram of an insert operation of the file system to insert a new key-value pair entry in a B-tree in accordance with an embodiment of the invention.

The operation of the file system 102 with respect to inserting a new key-value pair entry into a B-tree leaf node in accordance with an embodiment of the invention will now be described with references to the flow diagram of FIG. 4 using the exemplary leaf node shown in FIG. 3. At block 402, the file system receives an insert request from one of the applications to insert a new key-value pair entry into a B-tree. Next, at block 404, the file system finds a leaf node in the B-tree to insert the new key-value pair entry. In an embodiment, the file system finds the target leaf node using a standard search process that involves first looking at ranges of keys at the root node of the B-tree, which point to a node that may be the target leaf node to insert the new key-value pair entry or an index node that can lead to the leaf node. If the subsequent node is an index node, the file system again looks at ranges of keys at that node, which point to another node that may be the target leaf node to insert the new key-value pair entry or another index node that can lead to the target leaf node. The file system performs this search until the target leaf node is found.

Next, at step 406, the file system 102 finds an appropriate contiguous free space in the data section of the leaf node to store the key-value pair entry, i.e., a block of data that contains the key and the value of the key-value pair entry. This step involves looking at the size values stored in the free space slots in the directory section of the leaf node to find a contiguous free space of suitable size that can accommodate the size of the key-value pair entry to be inserted. Because the free space region is ordered by the size of the free space, binary search can be used to find the smallest free entry that can fit the key-value pair to be inserted. Using the example shown in FIG. 3, let's assume that the size of a new key-value pair entry KV4 to be entered is 96 bytes. In this example, the file system will read the size value S1 of the first free space slot SL4 to determine if the contiguous free space FS1, which is indexed by the free space slot SL4, can accommodate the new key-value pair entry KV4. Since the contiguous free space FS1 is 64 bytes in size, the file system will determine that this free space cannot fit the new key-value pair entry, which is 96 bytes long. The file system will then read the size value S2 of the second free space slot SL5 to determine if the contiguous free space FS2, which is indexed by the free space slot SL5, can accommodate the new key-value pair entry. Since the contiguous free space FS2 is 120 bytes in size, the file system will determine that this free space can fit the new 96-byte key-value pair entry, which would reduce the contiguous free space FS2 to 24 bytes. Thus, the file system will select the contiguous free space FS2 to store the new key-value pair entry.

Figure 5A:
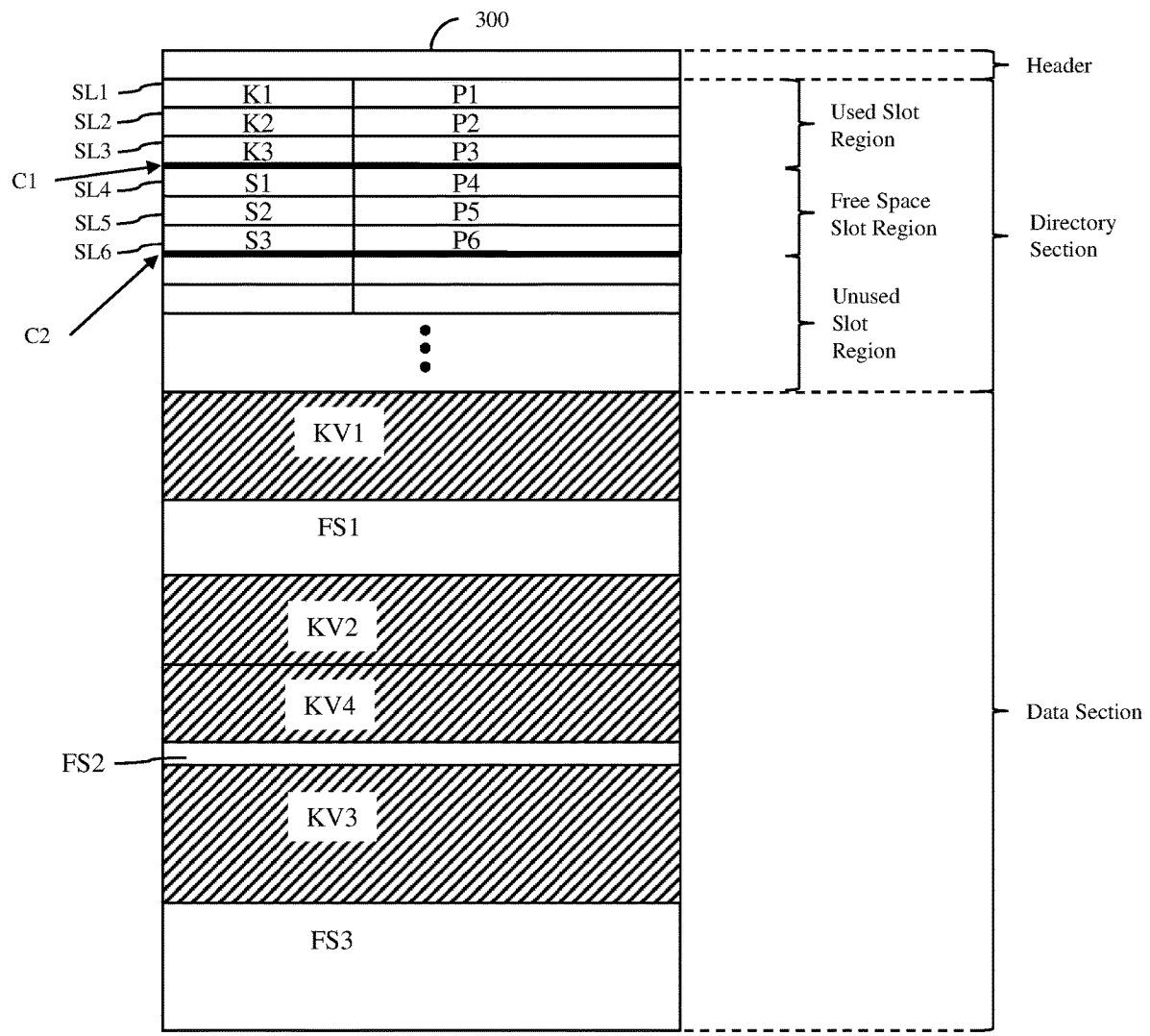
FIGS. 5A-5E illustrate the insert operation with respect to a B-tree leaf node in accordance with an embodiment of the invention.

Next, at step 408, the file system 102 stores the new key-value pair entry in the selected contiguous free space, which reduces the size of the selected contiguous free space by the size of the stored value. This step is illustrated in FIG. 5A, which shows that the new key-value pair entry KV4 is inserted into the contiguous free space FS2, which reduces the size of the contiguous free space FS2.

Figure 5B:
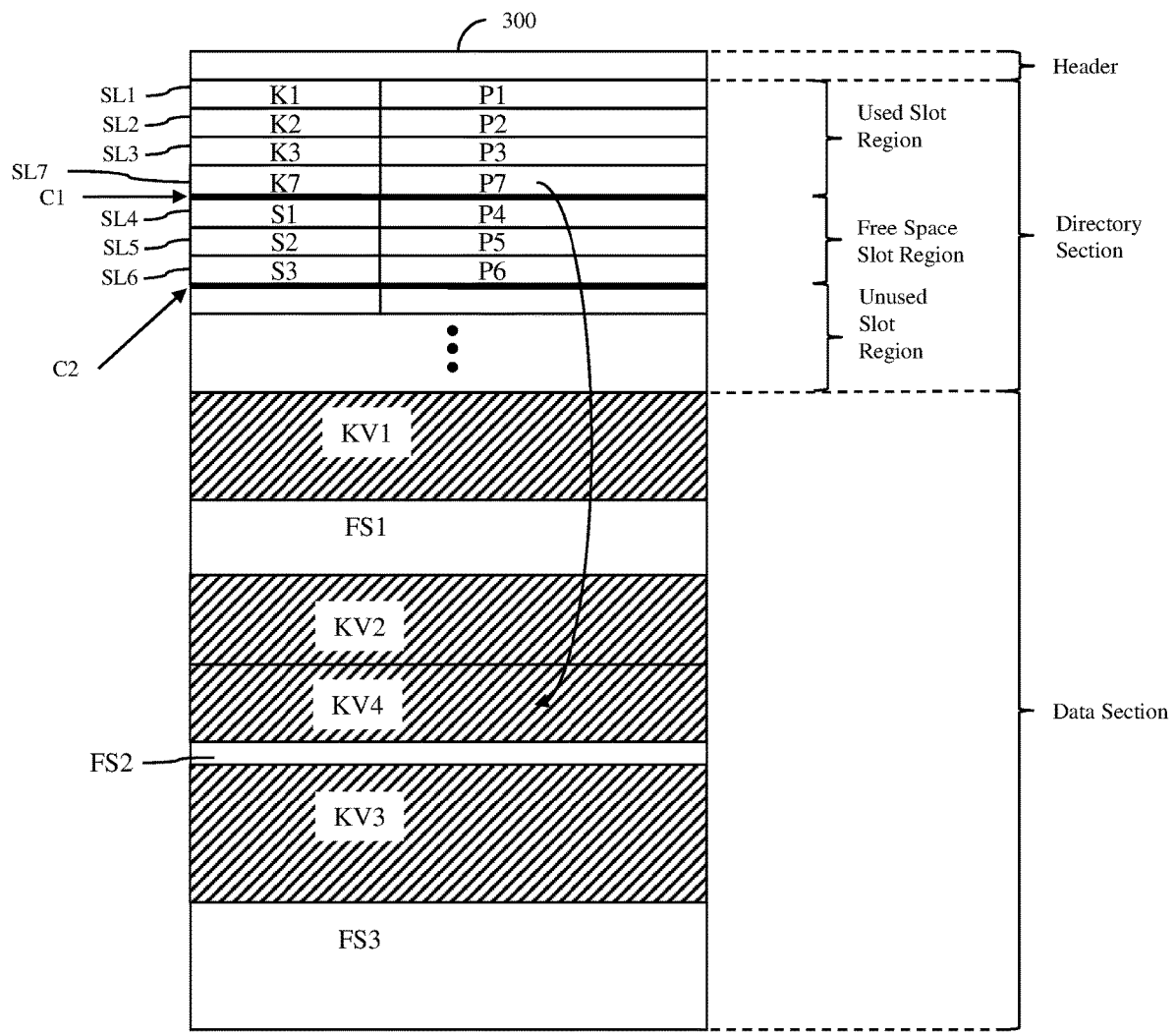

Next, at step 410, the file system 102 creates a new used slot after the last used slot in the used slot region of the directory section to index the new key-value pair entry stored in the data section. Thus, the free space slots are shifted down by one slot. The new used slot contains the key of the new key-value pair entry and a pointer that points to where the key-value pair entry was stored in the data section. This step is illustrated in FIG. 5B, which shows that a new used slot SL7 with a key K7 and a pointer P7 is inserted in the directory section of the leaf node after the used slot SL3, and the free space slots SL4, SL5 and SL6 have been shifted down by one slot. Thus, one slot from the unused slots has now been used for the new used slot SL7. If offsets are used as pointers, the pointer P7 of the new used slot SL7 may be identical to the original pointer P5 of the free space slot SL5 since the two pointers would have the same offset.

Next, at step 412, the file system 102 increases the first cursor by one to indicate the increase of used slots in the directory section of the leaf node by one used slot. This is indicated in FIG. 5B, which shows that the first cursor C1 has been moved to a new position below the new used slot SL7 from a previous position below the used slot SL3.

Next, at step 414, the file system 102 decreases the second cursor by one, only if the selected contiguous free space has been eliminated by the new key-value pair entry inserted into that contiguous free space, i.e., the size of the new key-value pair entry equals the size of the contiguous free space. In the example shown in FIG. 5B, the size of the new key-value pair entry KV4 does not equal the size of the original contiguous free space FS2, where the new key-value pair KV4 has been stored. Thus, as shown in FIG. 5B, the position of the second cursor C2 has not been changed relative to the first cursor C1.

Figure 5C:
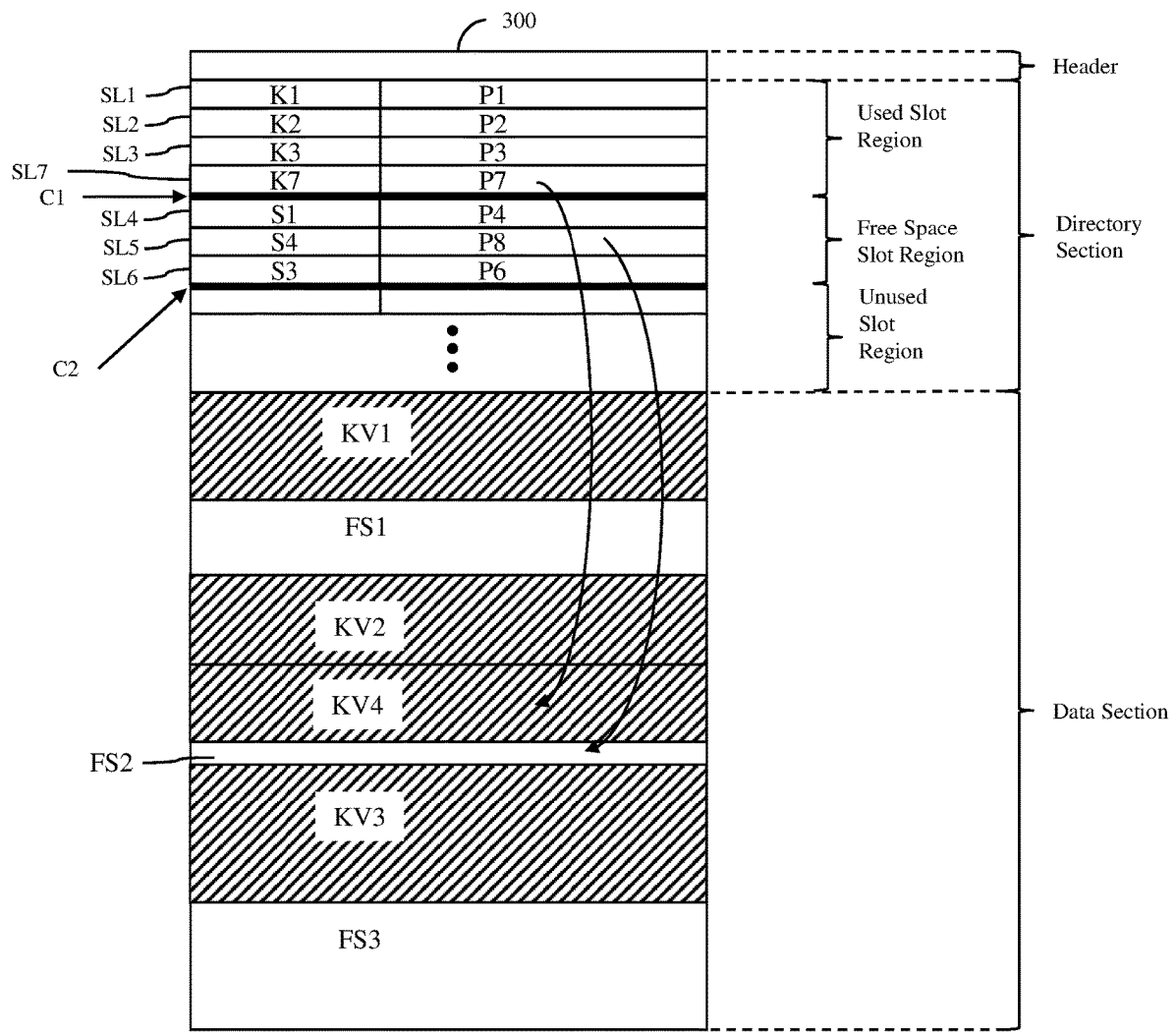

Next, at step 416, the file system 102 updates the free space slot that corresponds to the selected contiguous free space to reflect the selected contiguous free space after the new key-value pair entry has been stored in the selected contiguous free space. Obviously, this step is not needed if the selected contiguous free space is completely filled by the new key-value pair entry, and thus, eliminated. Updating the free space slot for the selected contiguous free space includes changing the size value of the free space slot and changing the pointer of the free space slot. This step is illustrated in FIG. 5C, which shows that the size value of the free slot SL5 has been changed from the size value S2 to a new size value S4, which represents 24 bytes. In FIG. 5C, the pointer of the free slot SL5 has also been changed from the pointer P5 to a new pointer P8, which points to the reduced contiguous free space FS2.

Figure 5D:
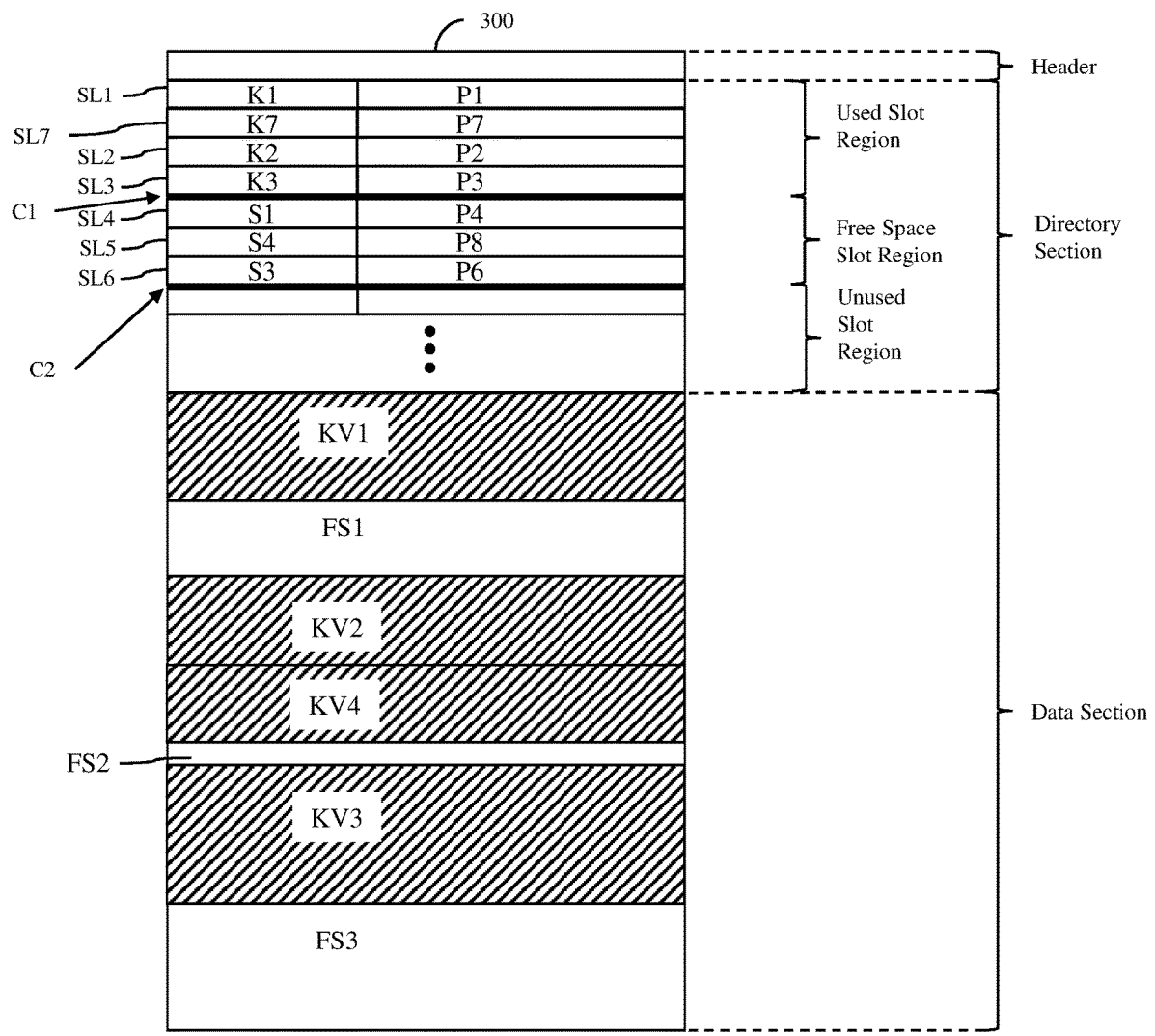

Next, at step 418, the file system 102 sorts the used slots in the directory section of the leaf node in accordance with the predefined order since the used slots may not be arranged in accordance with the predefined order due to the addition of the new used slot. This step is illustrated in FIG. 5D, which shows that the new used slot SL7 has been moved to a position between the used slot SL1 and the used slot SL2. In this example, it is assumed that the key K7 of the new used slot S7 falls between the key K1 of the used slot SL1 and the key K2 of the used slot SL2, or K1<K7<K2.

Figure 5E:
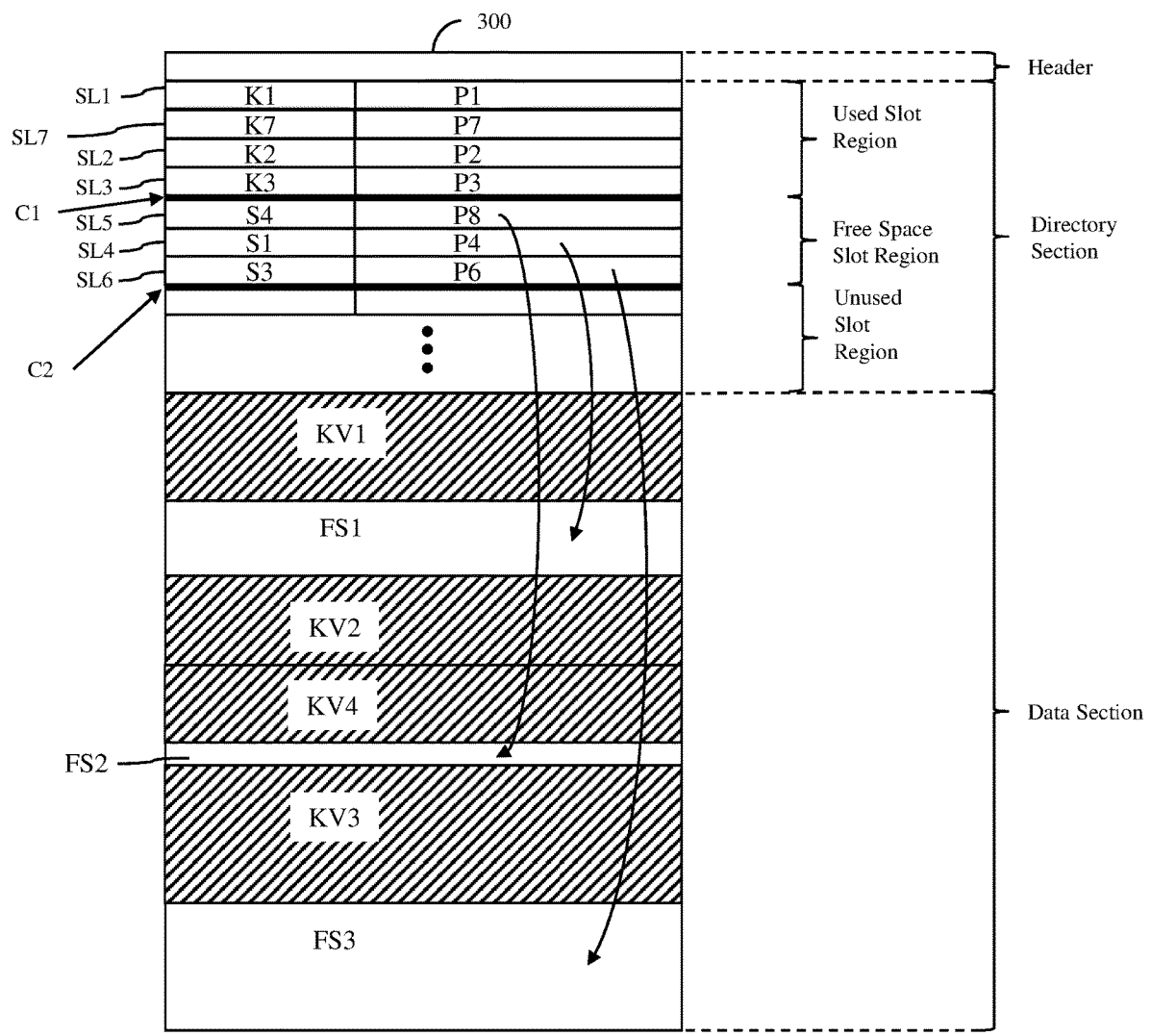

Next, at step 420, the file system 102 sorts the free space slots in the directory section of the leaf node in accordance with the predefined size order since the free space slots may not be arranged in accordance with the predefined size order due to the reduced size of the contiguous free space FS2. This step is illustrated in FIG. 5E, which shows that the free space slot SL5 has been moved to the first position of the free space slot region before the free space slot SL4 since the size (24 bytes) of the reduced contiguous free space FS2 is now smaller than the size (64 bytes) of the contiguous free space FS1. This sorting of the free space slots in the leaf node ensures that each new key-value pair entry for the leaf node will be stored in a contiguous free space without using larger contiguous free spaces, which may be needed for subsequent new key-value pair entries to be added to the leaf node. The insert operation then comes to an end.

Figure 6:
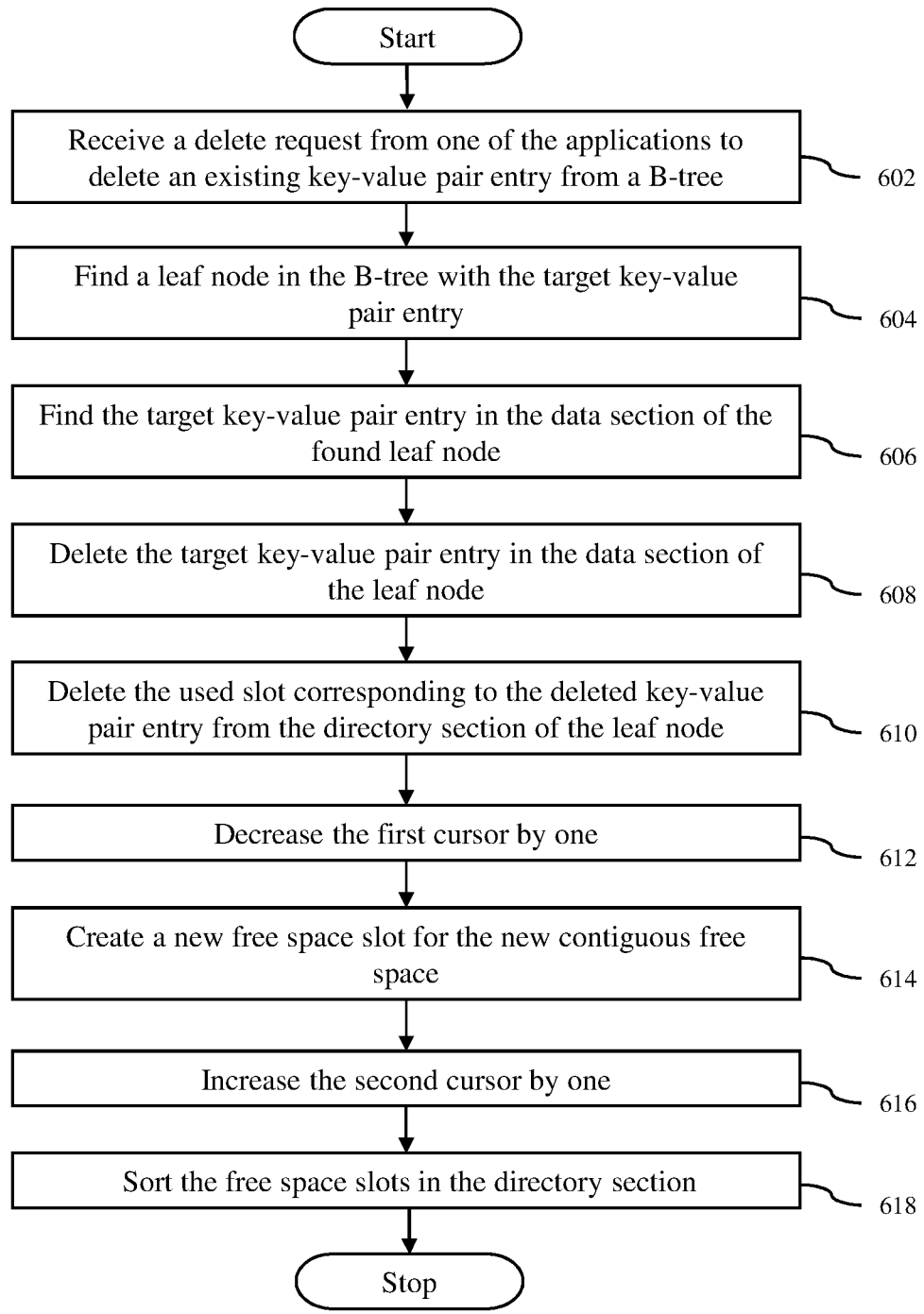
FIG. 6 is a process flow diagram of a delete operation of the file system to delete an existing key-value pair entry in a B-tree in accordance with an embodiment of the invention.

The operation of the file system 102 with respect to deleting an existing key-value pair entry from a B-tree leaf node in accordance with an embodiment of the invention will now be described with references to the flow diagram of FIG. 6 using the example of a leaf node shown in FIG. 5E. At block 602, the file system receives a delete request from one of the applications to delete an existing key-value pair entry from a B-tree. In the example shown in FIG. 5E, it is assumed that the delete request is for the existing key-value pair entry KV2 that is indexed in the directory section by the used slot SL2. It is also assumed here that the size of the key-value pair entry KV2 is 200 bytes. Next, at block 604, the file system finds a target leaf node of the B-tree with the target key-value pair entry to be deleted. In an embodiment, the file system finds the desired leaf node using the standard search process, as described above for the operation of inserting a new key-value pair entry in a B-tree.

Next, at step 606, the file system 102 finds the target key-value pair entry in the data section of the found leaf node. The target key-value pair entry can be found by locating the used slot in the directory section of the leaf node with the key of the target key-value pair entry and then using the pointer in that used slot to find the key-value pair entry in the data section. In an embodiment, this step involves reading each used slot in the directory section of the leaf node one-by-one from the first used slot until the used slot with the key of the target key-value pair entry is found. In the example shown in FIG. 5E, the target key-value pair entry KV2 can be found in the data section of the leaf node by locating the used slot SL2 in the directory section of the leaf node with the key K2 and using the pointer P2, which points to the target key-value pair entry KV2. In an embodiment, smarter search algorithms (such as binary search and interpolation search) can be used to find the used slot with the target key-value pair.

Figure 7A:
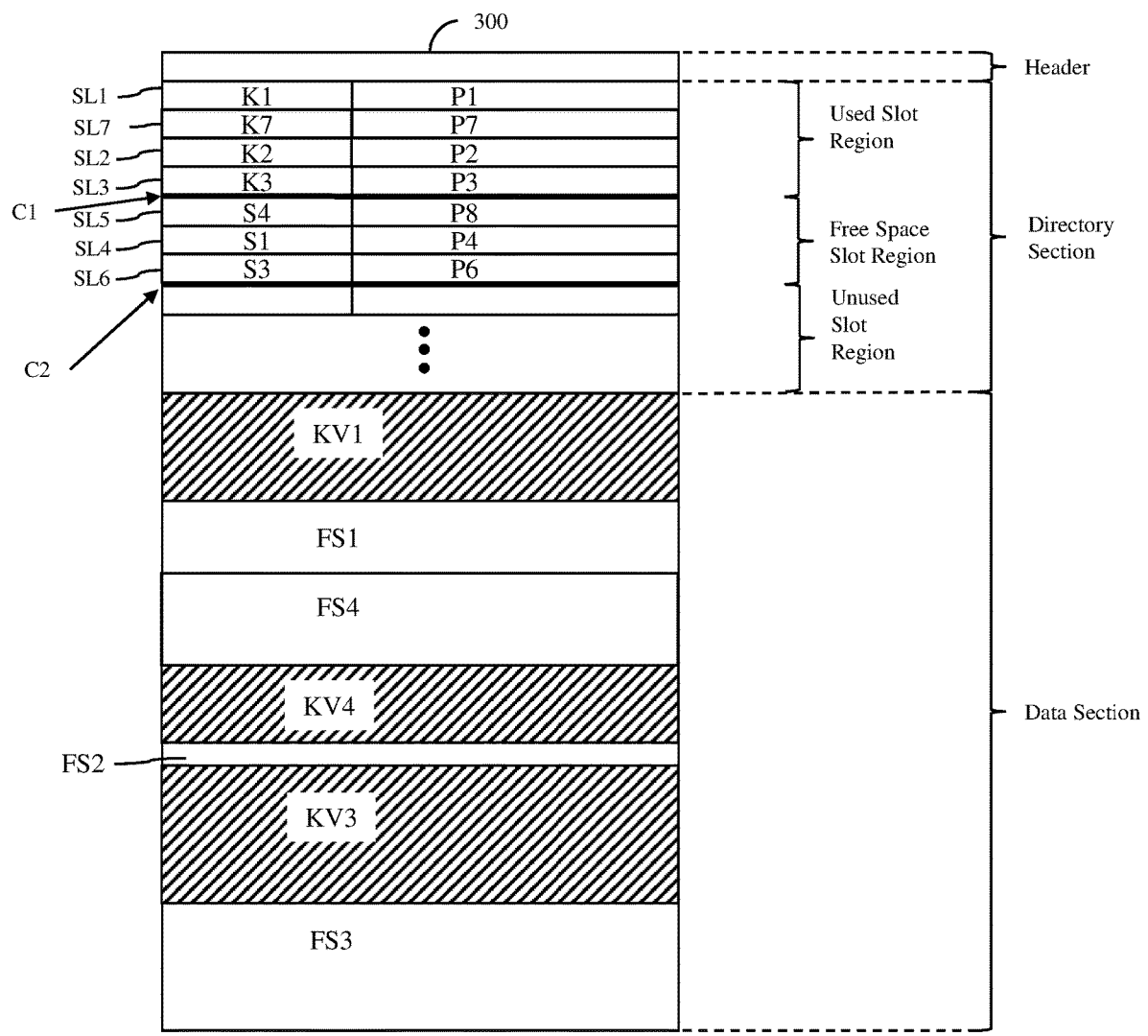
FIGS. 7A-7D illustrate the delete operation with respect to a B-tree leaf node in accordance with an embodiment of the invention.

Next, at step 608, the file system 102 deletes the target key-value pair entry in the data section of the leaf node. This step is illustrated in FIG. 7A, which shows that the target key-value pair entry KV2 has been deleted, which creates a new contiguous free space FS4. The size of the contiguous free space FS4 equals the size of the deleted key-value pair entry KV2.

Figure 7B:
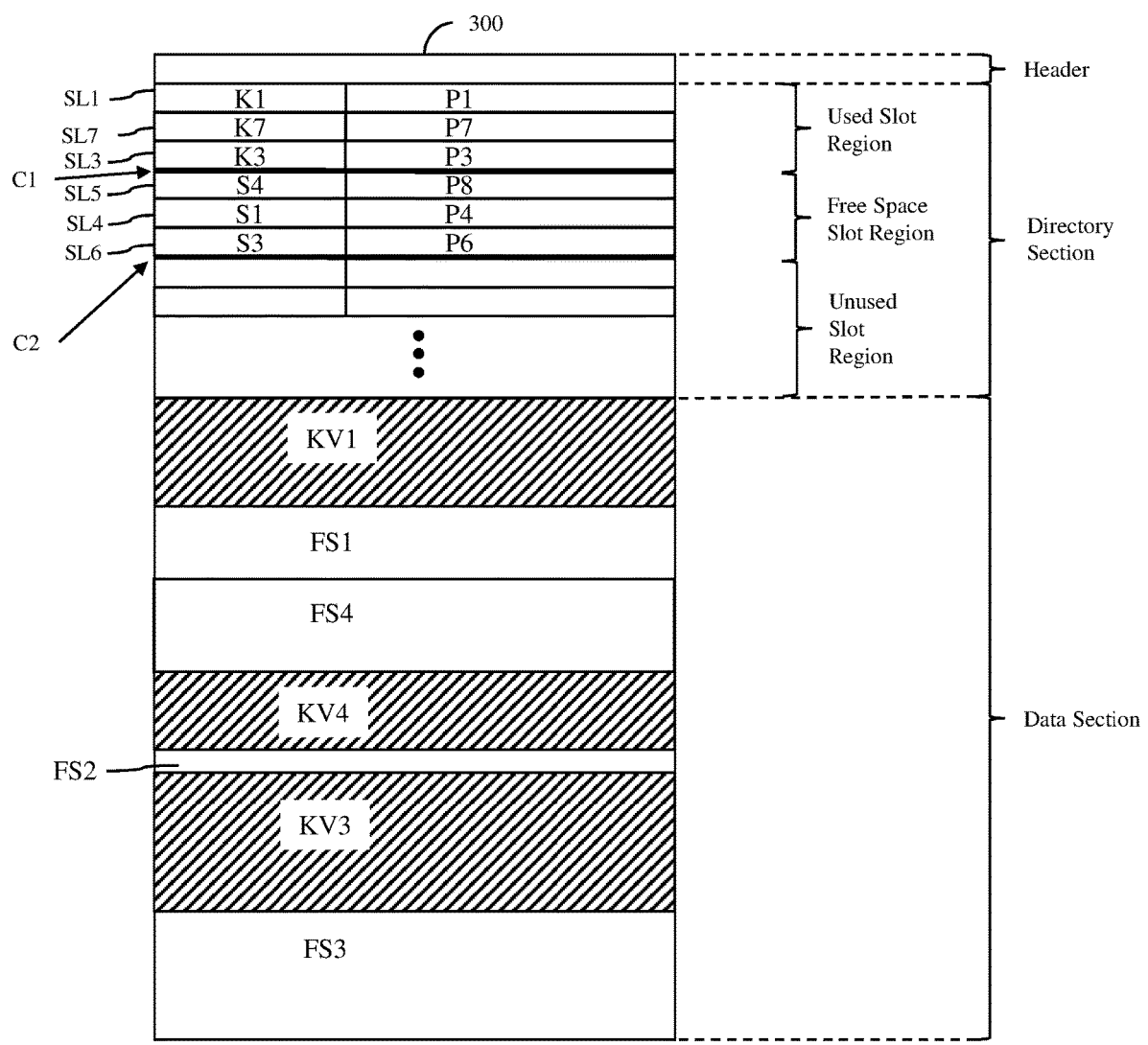

Next, at step 610, the file system 102 deletes the used slot corresponding to the deleted key-value pair entry from the directory section of the leaf node. Thus, the free space slots are shifted up by one slot. This step is illustrated in FIG. 7B, which shows that used slot SL2 corresponding to the key-value pair entry KV2 has been deleted and the free space slots SL4, SL5 and SL6 have been shifted up.

Next, at step 612, the file system 102 decreases the first cursor by one to indicate the removal of one used slot from the directory section of the leaf node. This step is illustrated in FIG. 7B, which shows that the first cursor C1 has been shifted up to reflect the value of the first cursor being changed from four to three.

Figure 7C:
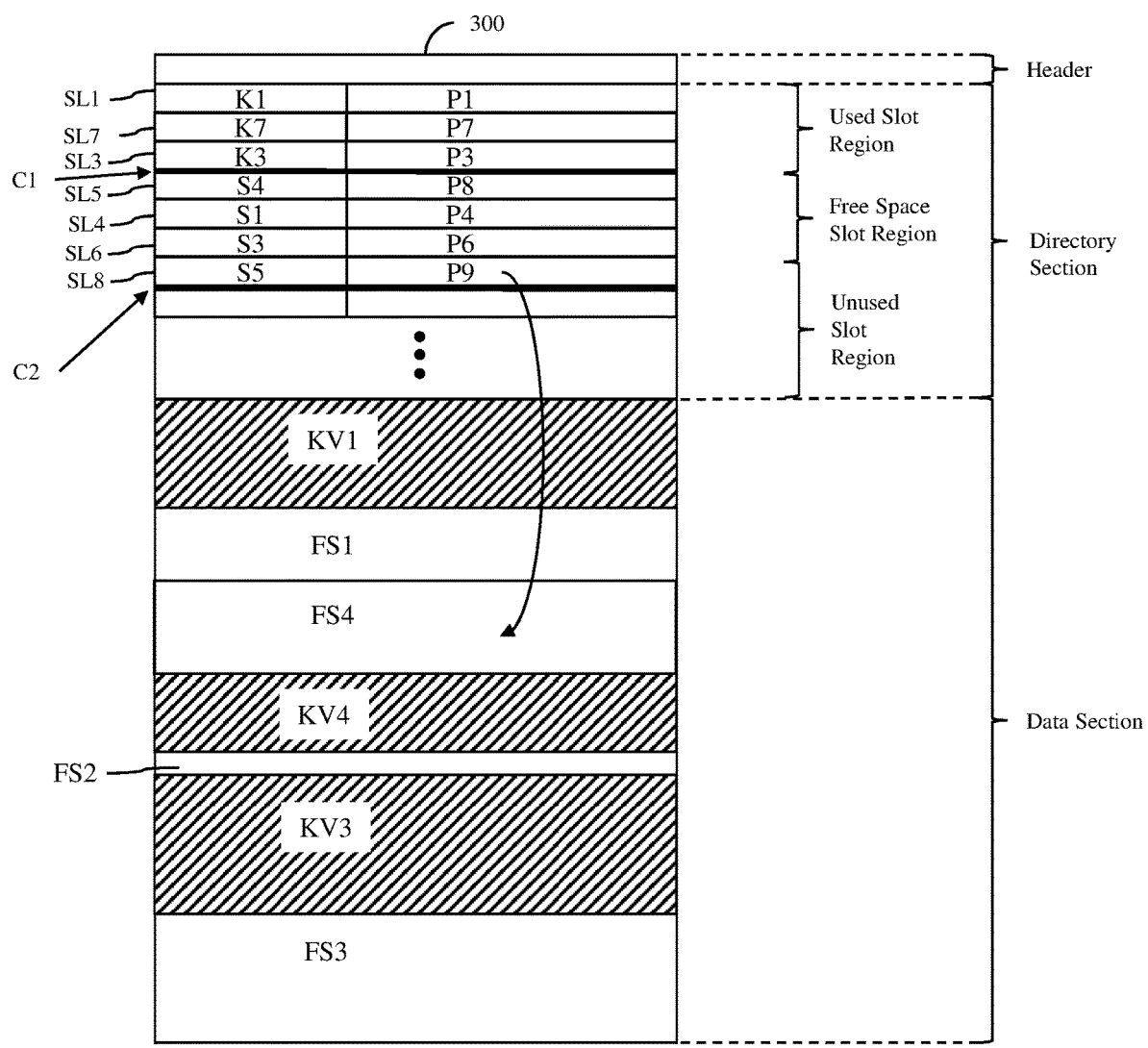

Next, at step 614, the file system 102 creates a new free space slot corresponding to the new contiguous free space, which equals the size of the deleted key-value pair entry. The new space slot would include a size value reflecting the size of the new contiguous free space and a pointer pointing to the new contiguous free space. The creation of the new free space slot reduces the number of slots in the unused slot region of the directory section. However, since a used slot was deleted, the net change in the number of unused slots would be zero. This step is illustrated in FIG. 7C, which shows a new free space slot SL8 that includes a size value S5 representing 96 bytes (the size of the deleted key-value pair entry KV2) and a pointer P9 that points to the new contiguous free space FS4.

Next, at step 616, the file system increases the second cursor by one to reflect the addition of one free space slot. This step is illustrated in FIG. 7C, which shows that the second cursor C2 has been shifted down to reflect the value of the second cursor being changed from three to four.

Figure 7D:
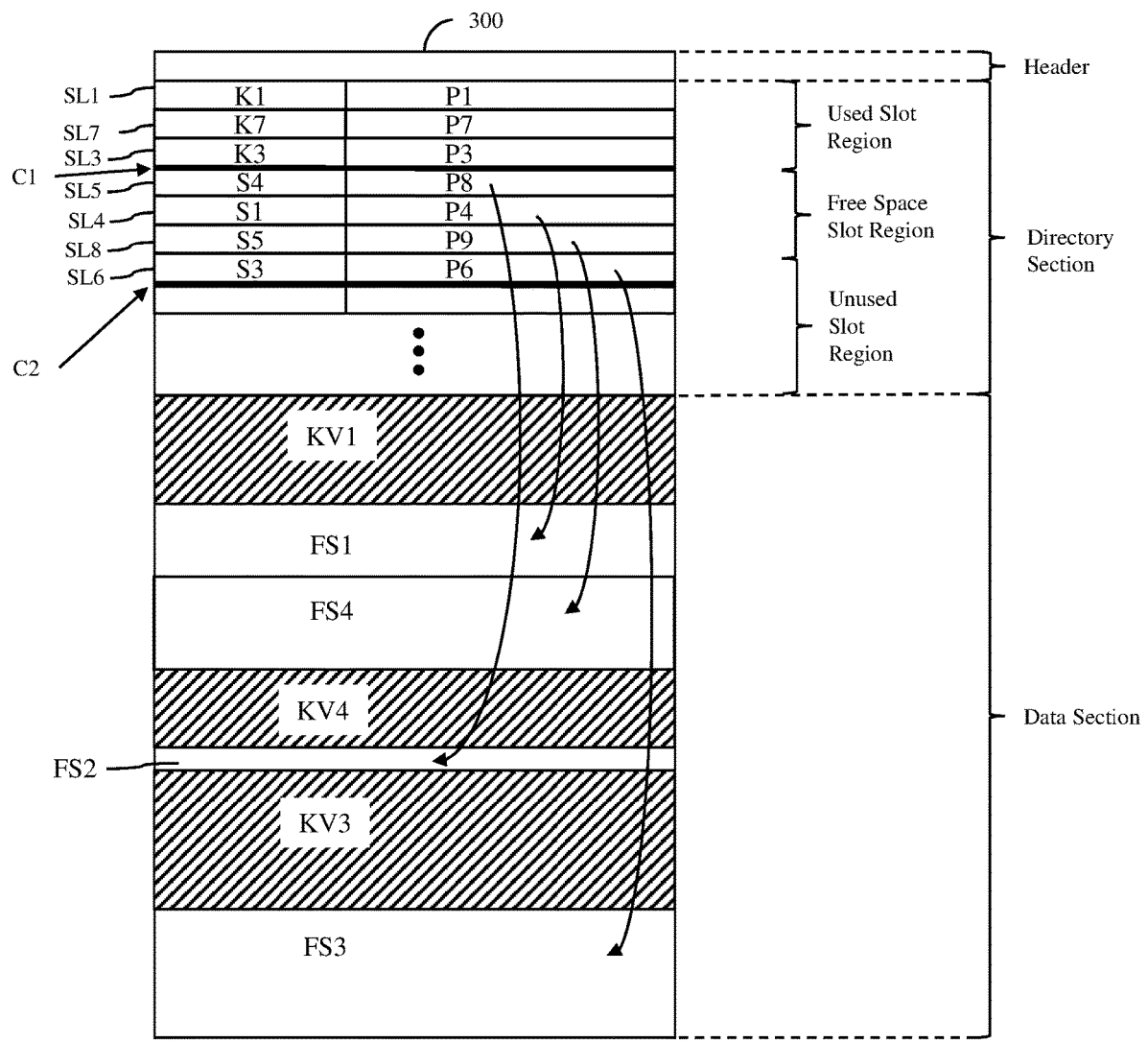

Next, at step 618, the file system 102 sorts the free space slots in the directory section in accordance with the predefined size order since the free space slots may not be arranged in accordance with the predefined size order due to the changes in the free space slots. For the example shown in FIG. 7C, the contiguous free spaces from the smallest to the largest are as follows: the contiguous free space FS2 (24 bytes), the contiguous free space FS1 (64 bytes), the contiguous free space FS4 (96 bytes), the contiguous free space FS3 (244 bytes). Thus, as illustrated in FIG. 7D, the free space slots have been sorted by their size values such that the new free space slot SL8 (96 bytes) has been moved to the third position of the free space slot section between the free space slot SL4 (64 bytes) and the free space slot SL6 (244 bytes). This sorting of the free space slots in the leaf node ensures that each new key-value pair entry for the leaf node will be stored in a free space without using larger free spaces, which may be needed for subsequent new values of key-value pair entries to be added to the leaf node. The delete operation then comes to an end.

As key-value pair entries are added to and deleted from the data section of the leaf node, the free spaces in the data section may become numerous and/or significantly reduced in size, which may not be useful for key-value entries except for very small key-value entries. Thus, the file system 102 may periodically pack the stored key-value pairs in the data section to create a single large contiguous free space. That is, the stored key-value pairs in the data section are squeezed to remove contiguous free spaces between the stored key-value pairs. In an embodiment, the stored key-value pairs in the data section are packed so that the stored key-value pairs in the data section are situated at the front of the data section and the contiguous free space is situated after the stored key-value pairs.

Figure 8:
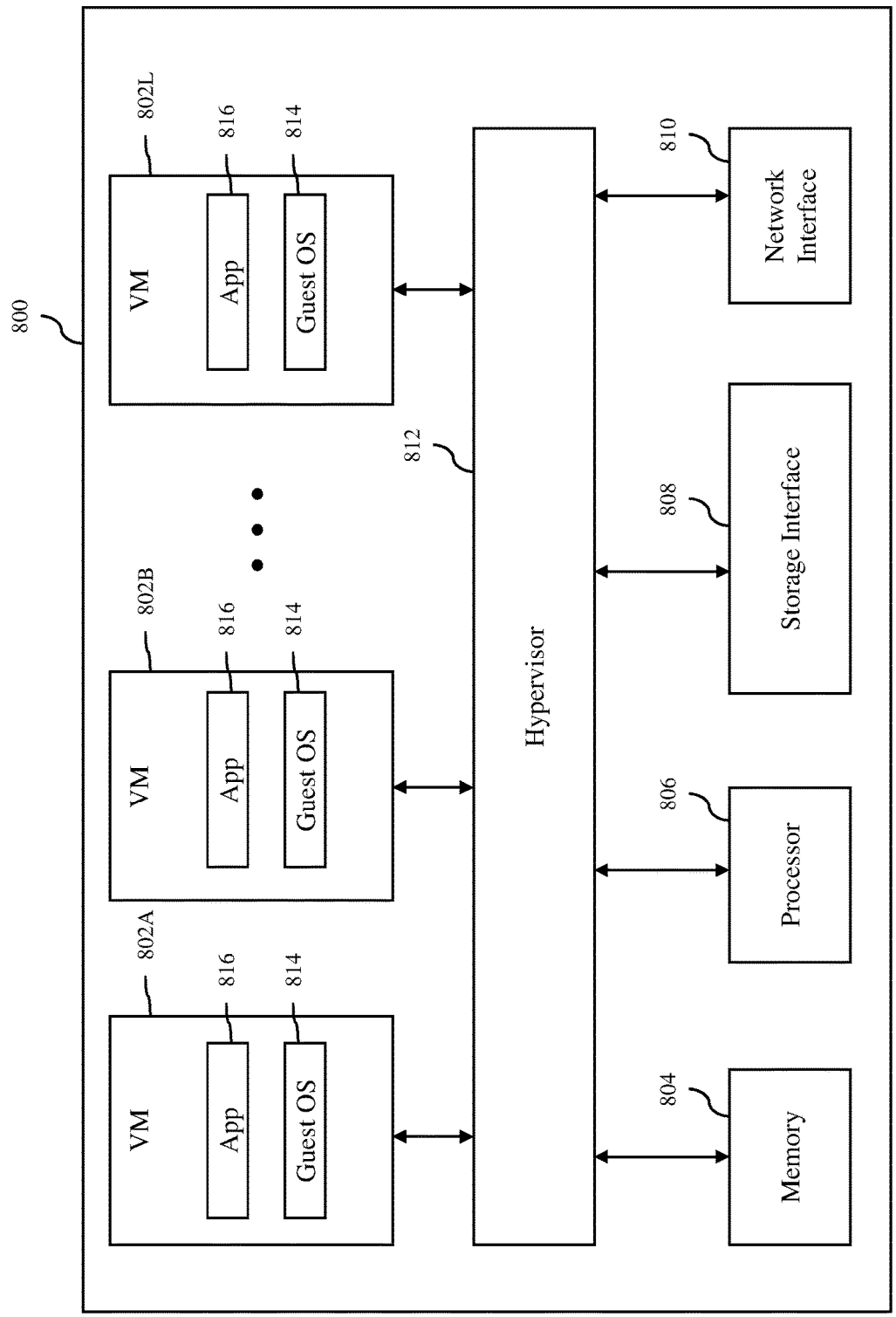
FIG. 8 is a block diagram of a physical computer system with a number of virtual machines in which the file system in accordance with an embodiment of the invention may be implemented.

The file system 102 is typically part of an operating system (OS) of a computer system, which may be a physical computer system, such as a physical server, or a virtual computer system, such as a virtual machine. Turning now to FIG. 8, a physical computer system 800 in which the file system may be implemented is shown. In FIG. 8, the physical connections between the various components of the computer system are not illustrated. As shown in FIG. 8, the physical computer system is configured to support a number of virtual machines (VMs) 802A, 802B . . . 802L (where L is a positive integer). The number of VMs supported by the physical computer system can be anywhere from one to more than one hundred. The exact number of VMs supported by the physical computer system is only limited by the physical resources of the physical computer system. The VMs share at least some of the hardware resources of the physical computer system, which include one or more system memories 804, one or more processors 806, a storage interface 808, and a network interface 810. Each system memory, which may be random access memory (RAM), is the volatile memory of the physical computer system. Each processor can be any type of a processor, such as a central processing unit (CPU) commonly found in a personal computer. The storage interface is an interface that allows that physical computer system to communicate with one or more physical storage systems. As an example, the storage interface may be a host bus adapter or a network file system interface. The network interface is an interface that allows the physical computer system to communicate with other devices through one or more computer networks. As an example, the network interface may be a network adapter.

In the illustrated embodiment, the VMs 802A, 802B . . . 802L run on "top" of a hypervisor 812, which is a software interface layer that, using virtualization technology, enables sharing of the hardware resources of the physical computer system 800 by the VMs. However, in other embodiments, one or more of the VMs can be nested, i.e., a VM running in another VM. Any computer virtualization architecture can be implemented. For example, the hypervisor may run on top of the physical computer system's operating system or directly on hardware of the physical computer system. With the support of the hypervisor, the VMs provide isolated execution spaces for guest software. Each VM may include a guest operating system 814, one or more guest applications 816. The guest operating system manages virtual system resources made available to the corresponding VM by the hypervisor, and, among other things, the guest operating system forms a software platform on top of which the guest applications run.

The file system 102 may be implemented in one or more VMs 802A, 802B . . . 802L running in the physical computer system 800 as part of their OS, i.e., the guest OS 814. Thus, in this implementation, the file system allows guest applications 816 to access physical storage systems available to the physical computer system. The file system may also be implemented in the physical computer system as part of the host OS. Thus, the file system may be implemented in the OS of any physical or virtual computer system.

Figure 9:
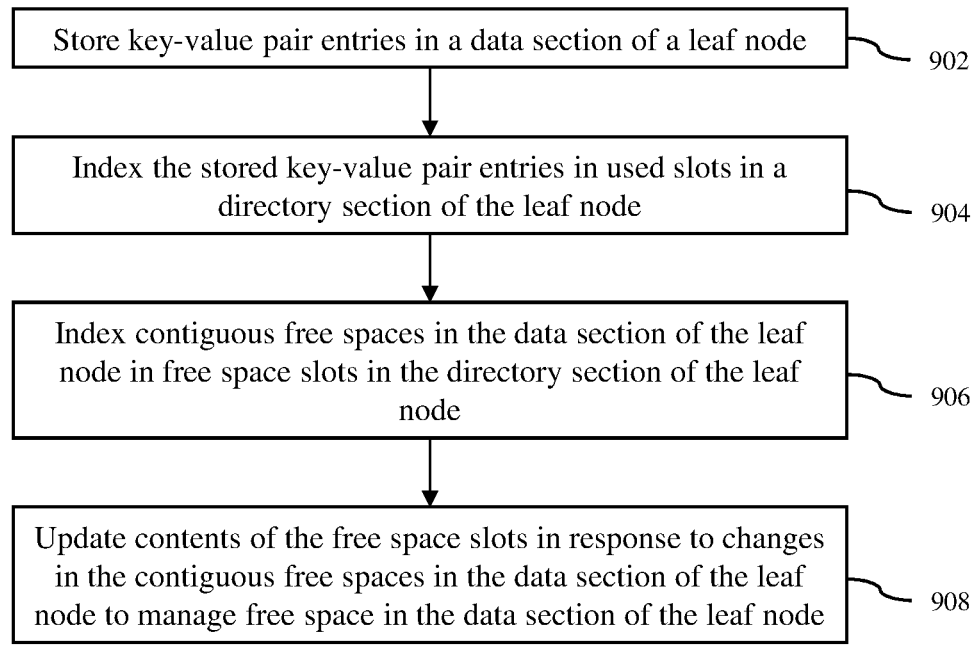
FIG. 9 is a flow diagram of a method for managing leaf nodes of a B-tree for a file system of a computer system in accordance with an embodiment of the invention.

A method for managing leaf nodes of a B-tree for a file system of a computer system in accordance with an embodiment of the invention is described with reference to a flow diagram of FIG. 9. At block 902, key-value pair entries are stored in a data section of a leaf node, wherein values of the key-value pair entries are variable in size. At block 904, the stored key-value pair entries are indexed in used slots in a directory section of the leaf node. Each used slot includes at least a pointer pointing to a key-value pair entry stored in the data section. At block 906, contiguous free spaces in the data section of the leaf node are indexed in free space slots in the directory section of the leaf node. Each free space slot includes a pointer pointing to one of the contiguous free spaces in the data section. At block 908, contents of the free space slots are updated in response to changes in the contiguous free spaces in the data section of the leaf node to manage free space in the data section of the leaf node.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing leaf nodes of a B-tree for a file system of a computer system, the method comprising:
    storing key-value pair entries in a data section of a leaf node, wherein values of the key-value pair entries are variable in size;
    indexing the stored key-value pair entries in used slots in a directory section of the leaf node, each used slot including at least a pointer pointing to a key-value pair entry stored in the data section;
    indexing contiguous free spaces in the data section of the leaf node in free space slots in the directory section of the leaf node, each free space slot including a pointer pointing to one of the contiguous free spaces in the data section; and
    updating contents of the free space slots in response to changes in the contiguous free spaces in the data section of the leaf node to manage free space in the data section of the leaf node.

2. The method of claim 1, wherein the free space slots in the directory section include size values that represent sizes of the contiguous free spaces corresponding to the free space slots, and wherein storing the key-value pair entries in the data section of the leaf node includes reading at least one size value contained in the free space slots in the directory section to find a target contiguous free space of suitable size in the data section for a particular key-value pair entry to be stored.

3. The method of claim 2, wherein the free space slots are sorted based on the size values in the free space slots, and wherein reading at least one size value contained in the free space slots includes sequentially reading the free space slots until the target contiguous free space of suitable size is found.

4. The method of claim 2, further comprising:
    storing the particular key-value pair entry in the target contiguous free space of suitable size in the data section; and
    updating the size value of the free space slot corresponding to the contiguous free space of suitable size after the particular key-value pair entry has been stored in the contiguous free space of suitable size.

5. The method of claim 2, further comprising:
    finding a target key-value pair entry stored in the data section using the keys contained in the used slots in the directory section;
    deleting the target key-value pair entry in the data section; and
    creating a new free space slot in the directory section for a new contiguous free space created by the deleted target key-value pair entry.

6. The method of claim 2, further comprising sorting the free space slots based on the size values contained in the free space slots after a change in the free space slots in the directory section.

7. The method of claim 1, further comprising sorting the used slots based on the keys contained in the used slots after a change in the used slots in the directory section.

8. The method of claim 1, wherein each used slot in the directory section of the leaf node includes a key of a particular key-value pair entry stored in the data section and a pointer pointing to the particular key-value pair entry stored in the data section.

9. A non-transitory computer-readable storage medium containing program instructions for managing leaf nodes of a B-tree for a file system, wherein execution of the program instructions by one or more processors of a computer system causes the one or more processors to perform steps comprising:

storing key-value pair entries in a data section of a leaf node, wherein values of the key-value pair entries are variable in size;

indexing the stored key-value pair entries in used slots in a directory section of the leaf node, each used slot including at least a pointer pointing to a key-value pair entry stored in the data section;

indexing contiguous free spaces in the data section of the leaf node in free space slots in the directory section of the leaf node, each free space slot including a pointer pointing to one of the contiguous free spaces in the data section; and updating contents of the free space slots in response to changes in the contiguous free spaces in the data section of the leaf node to manage free space in the data section of the leaf node.

10. The computer-readable storage medium of claim 9, wherein the free space slots in the directory section include size values that represent sizes of the contiguous free spaces corresponding to the free space slots, and wherein storing the key-value pair entries in the data section of the leaf node includes reading at least one size value contained in the free space slots in the directory section to find a target contiguous free space of suitable size in the data section for a particular key-value pair entry to be stored.

11. The computer-readable storage medium of claim 10, wherein the free space slots are sorted based on the size values in the free space slots, and wherein reading at least one size value contained in the free space slots includes sequentially reading the free space slots until the target contiguous free space of suitable size is found.

12. The computer-readable storage medium of claim 10, wherein the steps further comprise:

storing the particular key-value pair entry in the target contiguous free space of suitable size in the data section; and updating the size value of the free space slot corresponding to the contiguous free space of suitable size after the particular key-value pair entry has been stored in the contiguous free space of suitable size.

13. The computer-readable storage medium of claim 10, wherein the steps further comprise:

finding a target key-value pair entry stored in the data section using the keys contained in the used slots in the directory section;

deleting the target key-value pair entry in the data section; and creating a new free space slot in the directory section for a new contiguous free space created by the deleted target key-value pair entry.

14. The computer-readable storage medium of claim 10, wherein the steps further comprise sorting the free space slots based on the size values contained in the free space slots after a change in the free space slots in the directory section.

15. The computer-readable storage medium of claim 9, wherein the steps further comprise sorting the used slots based on the keys contained in the used slots after a change in the used slots in the directory section.

16. The computer-readable storage medium of claim 9, wherein each used slot in the directory section of the leaf node includes a key of a particular key-value pair entry stored in the data section and a pointer pointing to the particular key-value pair entry stored in the data section.

17. A system comprising:
memory; and
a processor configured to:
store key-value pair entries in a data section of a leaf node, wherein the key-value pair entries are variable in size;
index the stored key-value pair entries in used slots in a directory section of the leaf node, each used slot including a key of a key-value pair entry stored in the data section and a pointer pointing to the key-value pair entry stored in the data section;
index contiguous free spaces in the data section of the leaf node in free space slots in the directory section of the leaf node, each free space slot including a pointer pointing to one of the contiguous free spaces in the data section; and
update contents of the free space slots in response to changes in the contiguous free spaces in the data section of the leaf node to manage free space in the data section of the leaf node.

18. The system of claim 17, wherein the free space slots include size values that represent sizes of contiguous free spaces corresponding to the free space slots, and wherein the processor is configured to:
read at least one size value contained in the free space slots in the directory section to find a target contiguous free space of suitable size in the data section to store a particular key-value pair entry;
store the particular key-value pair entry in the contiguous free space of suitable size in the data section; and
update the size value of the free space slot corresponding to the contiguous free space of suitable size after the particular key-value pair entry has been stored in the contiguous free space of suitable size.

19. The system of claim 18, wherein the processor is configured to sort the free space slots based on the size values contained in the free space slots after a change in the free space slots in the directory section.

20. The system of claim 17, wherein the processor is configured to:
find a target key-value pair entry stored in the data section using the keys contained in the used slots in the directory section;
delete the target key-value pair entry in the data section; and
creating a new free space slot in the directory section for a new contiguous free space created by the deleted target key-value pair entry.

* * * * *